US011675123B2

(12) United States Patent
Schlepple

(10) Patent No.: US 11,675,123 B2
(45) Date of Patent: Jun. 13, 2023

(54) RADIATION-INDUCED BIREFRINGENCE IN POLARIZATION-MAINTAINING FIBER

(71) Applicant: Cisco Technology, Inc., San Jose, CA (US)

(72) Inventor: Norbert Schlepple, Macungie, PA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/559,380

(22) Filed: Dec. 22, 2021

(65) Prior Publication Data

US 2023/0072462 A1 Mar. 9, 2023

Related U.S. Application Data

(60) Provisional application No. 63/242,066, filed on Sep. 9, 2021.

(51) Int. Cl.
*G02B 6/024* (2006.01)

(52) U.S. Cl.
CPC .................... *G02B 6/024* (2013.01)

(58) Field of Classification Search
CPC . G02B 6/024; C03C 25/6208; C03C 25/6213; B23K 26/53; B23K 26/55; C03B 2203/30
See application file for complete search history.

(56) References Cited

U.S. PATENT DOCUMENTS

| 2002/0081084 | A1* | 6/2002 | Matsumoto | G02B 6/3812 264/1.28 |
| 2004/0071420 | A1* | 4/2004 | Sezerman | G02B 6/2821 385/123 |
| 2008/0310789 | A1* | 12/2008 | Mihailov | G02B 6/02138 385/124 |
| 2009/0003753 | A1 | 1/2009 | Berkey et al. | |
| 2013/0108206 | A1* | 5/2013 | Sasaoka | G02B 6/02042 385/11 |
| 2016/0252673 | A1 | 9/2016 | Fini et al. | |
| 2017/0219768 | A1* | 8/2017 | Hayashi | G02B 6/02042 |
| 2018/0067254 | A1* | 3/2018 | Mihailov | G02B 6/02128 |

(Continued)

FOREIGN PATENT DOCUMENTS

| CN | 105005113 A | * | 10/2015 |
| JP | 62-178909 A | * | 8/1987 |

(Continued)

OTHER PUBLICATIONS

L. Fernandez et al. Strong birefringence tuning of optical waveguides with femtosecond laser irradiation of bulk fused silica and single mode fibers. Journal of Lightwave Technology, 31:22:3563-3569, Nov. 15, 2013. (Year: 2013).*

(Continued)

*Primary Examiner* — Michael Stahl
(74) *Attorney, Agent, or Firm* — Edell, Shapiro & Finnan, LLC

(57) ABSTRACT

Techniques are provided for radiation-induced birefringence in a Polarization-Maintaining Fiber (PMF). In one example, a fiber is obtained. At least one local volume of the fiber is irradiated to induce an end-to-end birefringence in the fiber. Based on the end-to-end birefringence induced in the fiber, a PMF is produced.

20 Claims, 11 Drawing Sheets

(56) References Cited

U.S. PATENT DOCUMENTS

| | | | |
|---|---|---|---|
| 2018/0109348 A1* | 4/2018 | Salsi | ............... H04B 10/503 |
| 2019/0243061 A1 | 8/2019 | Ahmad et al. | |
| 2019/0317288 A1 | 10/2019 | Fini et al. | |
| 2020/0088936 A1* | 3/2020 | Lindner | ............. C03B 37/0253 |

FOREIGN PATENT DOCUMENTS

| | | | |
|---|---|---|---|
| JP | 2007-108261 A | * | 4/2007 |
| WO | WO 2016/123719 A | * | 8/2016 |

OTHER PUBLICATIONS

Edmund Optics, "Understanding Waveplates and Retarders", May 8, 2021, 14 pages; http://web.archive.org/web/20210508042204/https://www.edmundoptics.com/knowledge-center/application-notes/optics/understanding-waveplates/.

RP Photonics Encyclopedia, "Polarization-maintaining fibers", Aug. 8, 2021, 8 pages; http://web.archive.org/web/20210808012511/https://www.rp-photonics.com/polarization_maintaining_fibers.html.

RP Photonics Encyclopedia, "Fiber Preforms", Jun. 21, 2021, 8 pages; http://web.archive.org/web/20210621192953/https://www.rp-photonics.com/fiber_preforms.html.

RP Photonics Encyclopedia, "Fiber Fabrication", May 30, 2021, 5 pages; http://web.archive.org/web/20210530111011/https://www.rp-photonics.com/fiber_fabrication.html.

RP Photonics Encyclopedia, "Birefringence", Jun. 4, 2021, 9 pages; http://web.archive.org/web/20210604045100/https://www.rp-photonics.com/birefringence.html.

RP Photonics Encyclopedia, "Single-mode Fibers", Aug. 8, 2021, 12 pages; http://web.archive.org/web/20210808012359/https://www.rp-photonics.com/single_mode_fibers.html.

Michael Kassner, "Fiber-optic ribbon cables: Factors you can't afford to ignore", TechRepublic, Apr. 8, 2015, 9 pages; https://www.techrepublic.com/article/fiber-optic-ribbon-cables-factors-you-cant-afford-to-ignore/.

Fiberlabs Inc., "Polarization-Maintaining Fiber (PM Fiber, PMF)", retrieved from Internet Dec. 9, 2021, 6 pages; https://www.fiberlabs.com/glossary/polarization-maintaining-fiber/.

Lei Yuan et al., "Stress-induced birefringence and fabrication of in-fiber polarization devices by controlled femtosecond laser irradiations", Optical Society of America, Jan. 2016, 10 pages.

Wikipedia, "Numerical aperture", May 21, 2021, 6 pages; https://en.wikipedia.org/wiki/Numerical_aperture.

Corning Incorporated, "SMF-28 Ultra Optical Fiber", PI1424, Nov. 2014, 2 pages.

\* cited by examiner

US 11,675,123 B2

RADIATION-INDUCED BIREFRINGENCE IN POLARIZATION-MAINTAINING FIBER

CROSS REFERENCE TO RELATED APPLICATION

This application claims the benefit of U.S. Provisional Application No. 63/242,066, filed Sep. 9, 2021, the entirety of which is incorporated herein by reference.

TECHNICAL FIELD

The present disclosure relates to fiber optic components.

BACKGROUND

A Polarization-Maintaining Fiber (PMF) can preserve the polarization of light. PMFs are commonly used to transfer linearly polarized light from a Remote Light Source (RLS) (e.g., a laser in a remote location) to a polarization-sensitive Photonics Integrated Circuit (PIC). For example, silicon photonics devices—which are used to modulate/transmit/ receive optical signals—rely on complimentary Continuous Wave (CW) laser sources to supply optical power to a transmitter. In many cases, the transmitter is off-chip and connected via optical fibers, particularly in dense and/or hot environments such as in Co-Packaged Optics (CPO) applications. There, the RLS may be several inches from the CPO, and PMFs can be used to transfer polarized light from the RLS to PICs.

DESCRIPTION OF EXAMPLE EMBODIMENTS

Overview

Techniques are provided for producing a Polarization-Maintaining Fiber (PMF). In one example, a fiber is obtained. At least one local volume of the fiber is irradiated to induce an end-to-end birefringence in the fiber. Based on the end-to-end birefringence induced in the fiber, a PMF is produced.

Example Embodiments

Today, PMF is regarded as expensive "specialty fiber." PMF material cost is a notable cost contributor at approximately two orders of magnitude. PMF termination/connectorization is a major cost driver because of the significant effort/cost required to connectorize PMFs with cables. For example, the polarization axes of the PMF must be manually aligned with the termination connector (e.g., by individually rotating the PMF). The manual effort/cost scales exponentially with increasing numbers of fibers per connector. To manufacture a PMF ribbon, each fiber must be manually rotated/oriented within the ribbon.

Accordingly, techniques are provided for inducing birefringence using radiation (e.g., emitted by a femtosecond laser) to produce a PMF. In one example, a femtosecond laser may add one or more stress patterns/points to a Single Mode Fiber (SMF) to induce birefringence and thereby create a PMF. In another example, birefringent (polarization-maintaining) waveguides may be directly written into blank fibers. These techniques may also be applied to convert Multi-Core Fibers (MCFs) into Polarization Maintaining MCFs (PM-MCFs).

In one example, techniques are provided for converting/ transforming an input fiber ribbon (e.g., an SMF ribbon or blank fiber ribbon) into a low-cost PMF ribbon using a femtosecond laser. The input fiber ribbon may be fully or partially converted into a PMF ribbon. For instance, one or more of the SMFs in a SMF ribbon—but not necessarily all of the SMFs—may be turned into PMFs.

A low-cost PMF ribbon design and process described herein may provide enough induced stress with sufficiently low Polarization Extinction Ratio (PER) to produce a functional PMF that is suitable, for example, for Remote Light Source (RLS) applications. The resulting PMF may retain one or more advantages of an input SMF, such as large/ round Mode Field Diameter (MFD), low cost, general availability, low loss, etc.

The techniques described herein may use widely available and low-cost SMF ribbons to reduce material cost for PMFs. In addition, fast/low-cost PMF termination/connectorization with all ribbon fibers may be achieved concurrently and without a need for rotation control during connectorization, thereby reducing connectorization costs. Moreover, pre-alignment of the PMF fast/slow axes relative to ribbon orientation may be realized at a high rotational accuracy, which reduces optical power loss.

Figure 1:
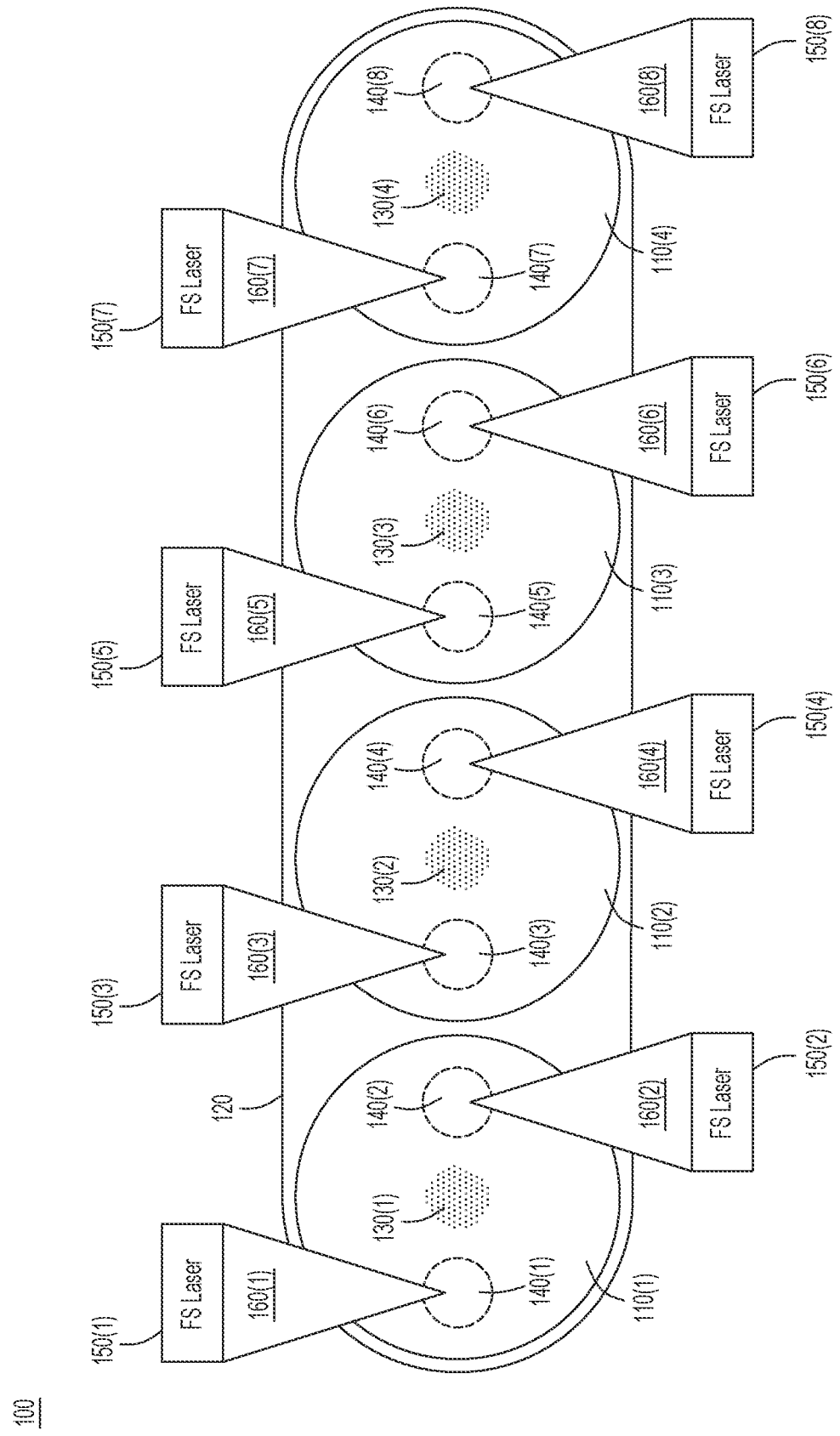
FIG. 1 illustrates a Polarization-Maintaining Fiber (PMF) ribbon that has been produced by irradiating local volumes of Single Mode Fibers (SMFs) in a SMF ribbon, where the local volumes are substantially parallel to the SMF ribbon, according to an example embodiment.

FIG. 1 illustrates PMF ribbon 100, according to an example embodiment. PMF ribbon 100 includes PMFs 110(1)-110(4) affixed in ribbon coating 120. PMF 110(1)

includes core 130(1), local volume 140(1), and local volume 140(2); PMF 110(2) includes core 130(2), local volume 140(3), and local volume 140(4); PMF 110(3) includes core 130(3), local volume 140(5), and local volume 140(6); and PMF 110(4) includes core 130(4), local volume 140(7), and local volume 140(8). Local volumes 140(1)-140(8) substantially parallel to PMF ribbon 100.

In this example, PMFs 110(1)-110(4) have been produced by irradiating local volumes 140(1)-140(8) using femtosecond lasers 150(1)-150(8). Femtosecond lasers 150(1)-150(8) may have high Numerical Apertures (NAs), and may be arranged in a fixed array. Femtosecond lasers 150(1)-150(8) may be configured to emit radiation 160(1)-160(8) (e.g., electromagnetic radiation) capable of penetrating ribbon coating 120. For example, radiation 160(1)-160(8) may have a wavelength of approximately 1 µm.

Inversely, ribbon coating 120 may be made of a material that permits penetration by radiation 160(1)-160(8). For instance, ribbon coating 120 may be a buffer of epoxy. In one specific example, ribbon coating 120 may be made from acrylate (e.g., one or more UV-curable acrylate resins) having an optical transmission window of approximately 1 µm. Ribbon coating 120 may permit penetration by radiation 160(1)-160(8) regardless of coloring. Thus, the matrix of ribbon coating 120 may be clear, semi-clear (e.g., with added color tones), or opaque.

In one example, a low-cost SMF ribbon may be obtained and post-processed to create PMF ribbon 100. The SMF ribbon may include glass SMFs with cores 130(1)-130(4) having substantially circular cross-sections. The SMFs may be, for instance, Corning® SMF-28® fibers. In the example of FIG. 1, the SMF ribbon includes four SMFs (each corresponding to PMFs 110(1)-110(4)). However, in general, the SMF ribbon may include any suitable number of individual SMF fibers (e.g., four, eight, twelve, etc.).

Local volumes 140(1)-140(8) of the SMF ribbon may be irradiated using femtosecond lasers 150(1)-150(8) to induce an end-to-end birefringence in the SMF ribbon, thereby producing PMF ribbon 100. In this example, each SMF is irradiated at local volumes 140(1)-140(8) to induce the end-to-end birefringence in each of the SMFs, thereby producing PMFs 110(1)-110(4). The end-to-end birefringence preserves the polarization of light propagating within PMFs 110(1)-110(4).

Femtosecond lasers 150(1)-150(8) may induce the end-to-end birefringence by altering a matrix structure of the SMF at local volumes 140(1)-140(8). More specifically, radiation 160(1)-160(8) may have focal points at local volumes 140(1)-140(8). The energy density of radiation 160(1)-160(8) at the focal points may be high enough to modify (e.g., without melting) the matrix structure of the SMF at local volumes 140(1)-140(8). This laser-writing process may produce inherent stress in the SMF at local volumes 140(1)-140(8) and, in particular, change the refractive index of the SMF at local volumes 140(1)-140(8). Thus, local volumes 140(1)-140(8) may become local, laser-induced stress points that create birefringence in the SMF circular core mode field/profile. Because local volumes 140(1)-140(8) may have gradual stress profiles, PMFs 110(1)-110(4) may be reliable from a mechanical perspective.

Depending on the profile (e.g., curvature) and refractive index of ribbon coating 120 and the SMFs, radiation 160(1)-160(8) may be refracted before reaching local volumes 140(1)-140(8). One or more additional lenses may be introduced to compensate for the refraction and ensure that local volumes 140(1)-140(8) are properly irradiated.

Criteria for local volumes 140(1)-140(8) (e.g., location/shape/size of the stress points) may be tailored for performance. At least the following factors may be configurable to achieve a desired balance between propagation loss and at least a minimum Polarization Extinction Ratio (PER) requirement: (1) the distance between a given core and a given local volume; (2) placement accuracy of local volumes 140(1)-140(8); and (3) induced end-to-end birefringence. Generally, higher accuracies may be achieved for smaller/closer placements of local volumes 140(1)-140(8).

Depending on the induced end-to-end birefringence associated with a given femtosecond laser, a given local volume may be moved closer to or farther from a given core. If the induced stress/birefringence changes the refractive index, local volumes 140(1)-140(8) may be placed far enough from cores 130(1)-130(4) to avoid optical power leakage. The distance between a given core and a given local volume (e.g., core 130(1) and local volume 140(1)) may differ among different combinations of cores 130(1)-130(4) and local volumes 140(1)-140(8). Likewise, in one example, the cross-sectional diameters of local volumes 140(1)-140(8) may be configurable (e.g., 10 µm) and may even differ among PMFs 110(1)-110(4).

In FIG. 1, local volumes 140(1)-140(8) are depicted with circular cross-sections. However, local volumes described herein may have any suitable cross-sectional shape (e.g., bow-ties). Furthermore, while local volumes 140(1)-140(8) are shown on opposite sides of cores 130(1)-130(4) in FIG. 1, it will be appreciated that local volumes described herein may be arranged in any suitable configuration within a PMF. And although FIG. 1 illustrates each PMF 110(1)-110(4) as having two local volumes 140(1)-140(8) (e.g., PMF 110(1) has local volumes 140(1) and 140(2), etc.), in general a PMF may have any suitable number of local volumes described herein arranged in any suitable configuration to create a meaningful gradient.

While FIG. 1 illustrates an example with PMF ribbon 100 (including PMFs 110(1)-110(4)), it will be appreciated that the techniques described herein may be performed on a per-fiber basis. In one example, an individual SMF may be obtained and converted into an individual PMF. The individual SMF, which may have a coating that is similar to ribbon coating 120, may have at least one local volume that is irradiated to induce an end-to-end birefringence in the SMF, thereby producing the PMF.

Figure 2:
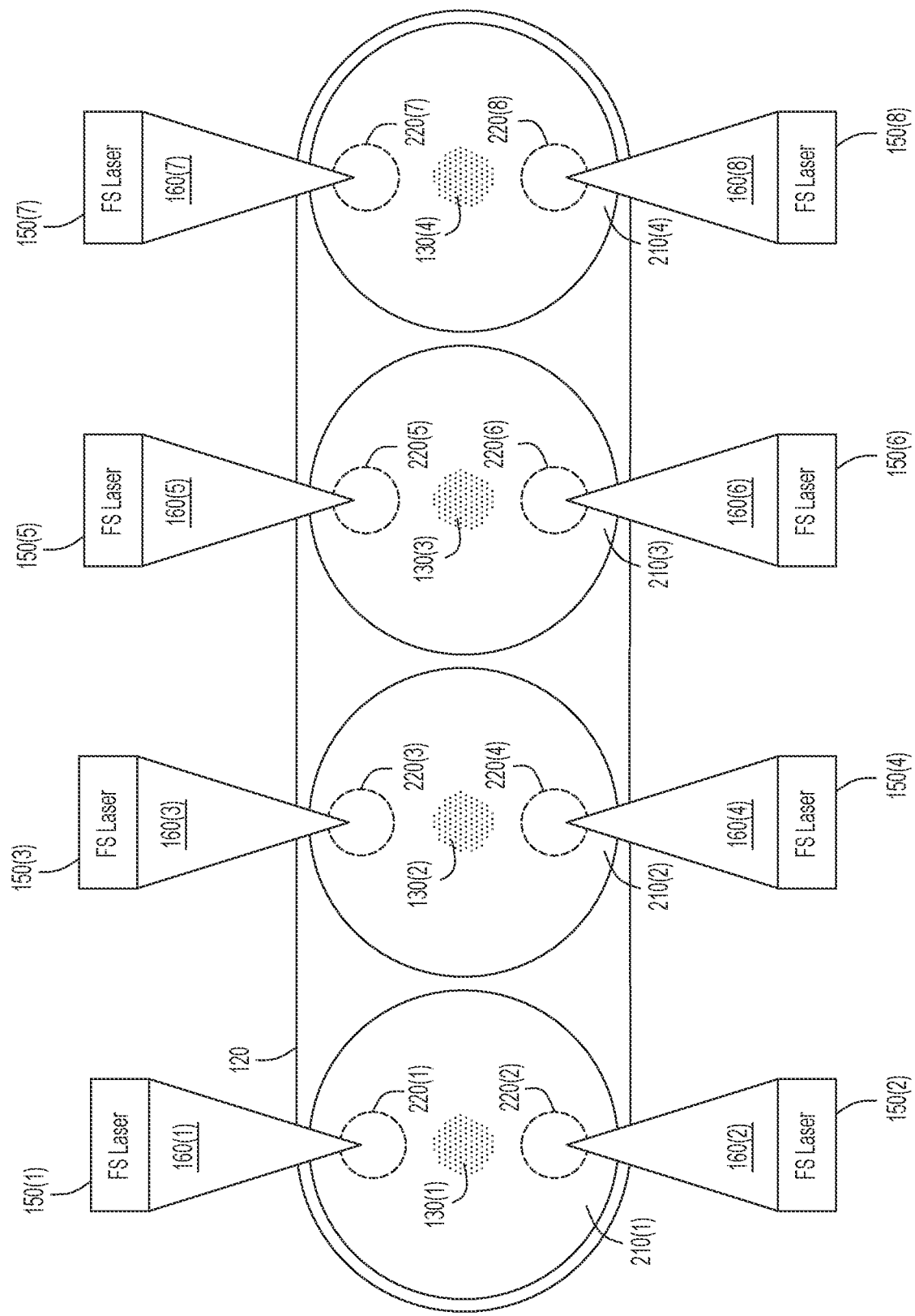
FIG. 2 illustrates a PMF ribbon that has been produced by irradiating local volumes of SMFs in a SMF ribbon, where the local volumes are substantially perpendicular to the SMF ribbon, according to an example embodiment.

With continuing reference to FIG. 1, FIG. 2 illustrates PMF ribbon 200, according to an example embodiment. PMF ribbon 200 includes PMFs 210(1)-210(4) affixed in ribbon coating 120. PMF 210(1) includes core 130(1), local volume 220(1), and local volume 220(2); PMF 110(2) includes core 130(2), local volume 220(3), and local volume 220(4); PMF 110(3) includes core 130(3), local volume 220(5), and local volume 220(6); and PMF 110(4) includes core 130(4), local volume 220(7), and local volume 220(8).

PMF ribbon 200 is similar to PMF ribbon 100, except that instead of irradiating local volumes 140(1)-140(8)—which are substantially parallel to PMF ribbon 100—femtosecond lasers 150(1)-150(8) may irradiate local volumes 220(1)-220(8), which are substantially perpendicular to PMF ribbon 200. That is, local volumes 220(1) and 220(2) are aligned within PMF 210(1) substantially perpendicular to PMF ribbon 200; local volumes 220(3) and 220(4) are aligned within PMF 210(2) substantially perpendicular to PMF ribbon 200; etc. Other than orientation, local volumes 220(1)-220(8) may be similar to local volumes 140(1)-140(8) and may be similarly irradiated.

PMFs described herein may have two polarization modes: one with a relatively slow phase velocity and which is polarized along a "slow axis," and another with a relatively fast phase velocity and which is polarized along a "fast axis." The fast axis and the slow axis of a PMF may be oriented at any suitable, configurable angles relative to a PMF ribbon. The configurable angles of fast axes and slow axes of the PMFs may be oriented by adjusting the angles of the local volumes relative to the PMF ribbon. In one example, the slow axes may align with the axes along the local volumes, and the fast axes may align substantially perpendicular to the axes along local volumes.

For instance, in FIG. 1, local volumes 140(1)-140(8) may be substantially parallel to ribbon 100, and as a result, PMFs 110(1)-110(4) each has a slow axis that is substantially parallel to ribbon 100 and a fast axis that is substantially perpendicular to ribbon 100. Meanwhile, in FIG. 2, local volumes 220(1)-220(8) are substantially perpendicular to ribbon 200, and as a result, PMFs 210(1)-210(4) each has a slow axis that is substantially perpendicular to ribbon 200 and a fast axis that is substantially parallel to ribbon 200.

The local volumes described herein may be oriented at any suitable, configurable angle relative to the ribbon. Thus, the induced birefringence (e.g., fast and slow axes) may also be oriented relative to the ribbon (e.g., relative to the line of individual fibers (fiber array line) within the ribbon) at any suitable, configurable angle. Therefore, the orientation of the fast axis and/or slow axis on each fiber, relative to the fiber alignment within the ribbon, may be set to parallel, orthogonal, or any angle in between (e.g., diagonal). This allows for free orientation control of the fast and slow axes via laser placement. In particular, controlling the rotational angle relative to the ribbon, post-processing, may enable connectorizing without requiring active angle control of individual fibers relative to a ferrule. It will be appreciated that the angles of fast and slow axes may differ between PMFs in the same PMF ribbon.

Figure 3:
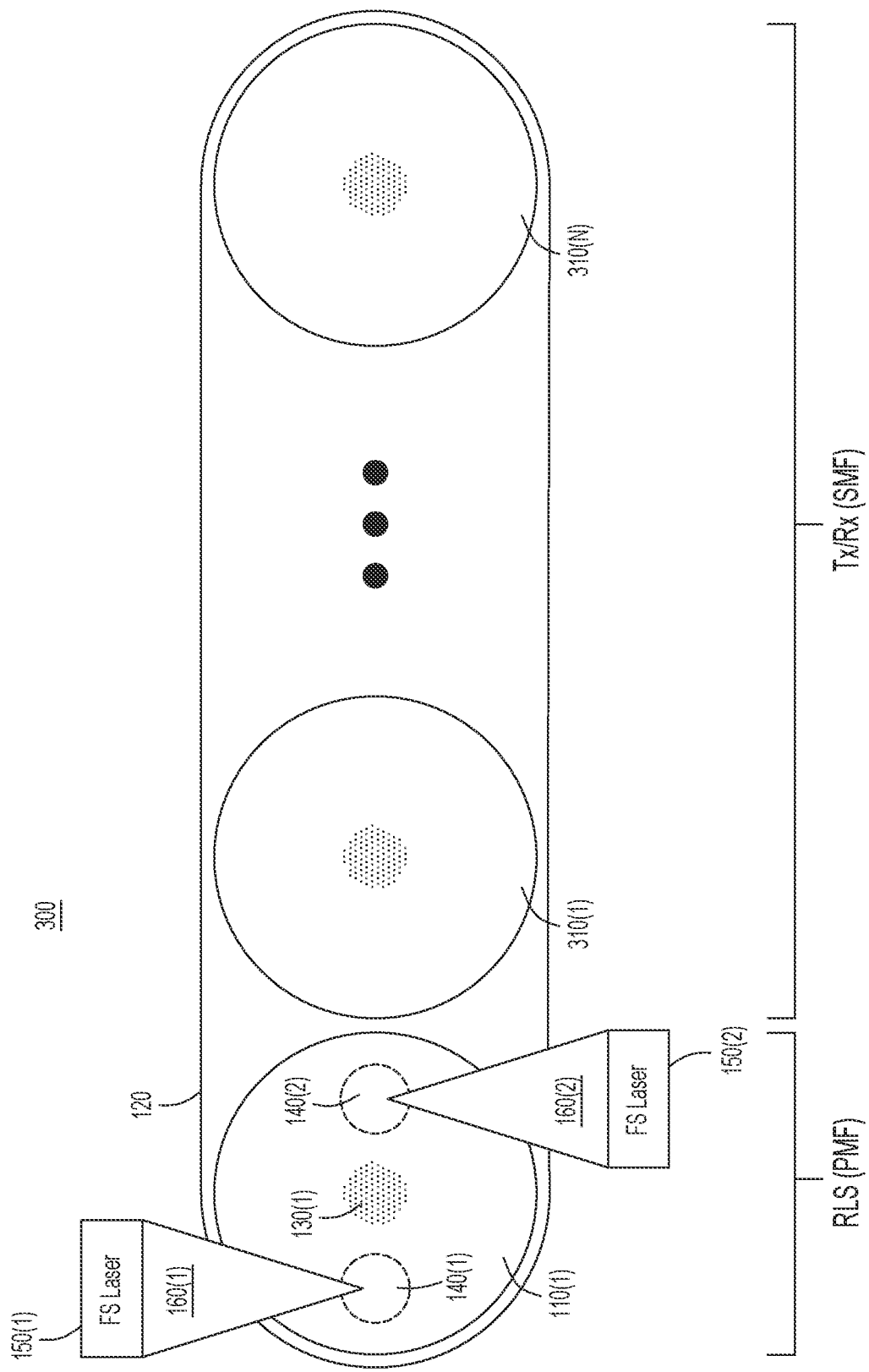
FIG. 3 illustrates a hybrid ribbon that includes (1) a PMF that has been produced by irradiating local volumes of an SMF in an SMF ribbon and (2) at least one SMF in which end-to-end birefringence has not been induced, according to an example embodiment.

With continuing reference to FIG. 1, FIG. 3 illustrates hybrid ribbon 300, according to an example embodiment. Hybrid ribbon 300 includes PMF 110(1), which has been produced by irradiating local volumes 140(1) and 140(2), and SMFs 310(1)-310(N), in which end-to-end birefringence has not been induced. Hybrid ribbon 300 may be produced in a similar manner as PMF ribbons 100 and 200, except that in this example only one of the SMFs in the SMF ribbon was irradiated to produce a PMF (PMF 110(1)). The other SMFs (SMFs 310(1)-310(N)) have not been irradiated and therefore remain SMFs. Thus, hybrid ribbon 300 is "hybrid" because it includes both PMF 110(1) and SMFs 310(1)-310(N).

Hybrid ribbon 300 may be a low-cost ribbon used in RLS applications. For example, one chip may have three channels: a laser input channel, a transmit channel, and a receive channel. PMF 110(1) may provide the polarized laser input from the remote laser to the chip. The laser input may proceed through an on-chip modulator and exit as a transmit signal over the transmit channel. The receive channel may carry return signals to the chip. Because the polarization of the transmit and receive signals may not necessarily need to be maintained, the transmit signal may be carried by SMFs 310(1) and 310(2), for example.

In general, any suitable number of SMFs in a hybrid ribbon may be converted to a PMF, and any suitable number of SMFs may remain SMFs. Furthermore, while the example of FIG. 3 involves irradiating local volumes 140(1) and 140(2)—which are substantially parallel to hybrid ribbon 300—in other examples, local volumes may be oriented at any suitable angle relative to a hybrid ribbon.

Figure 4:
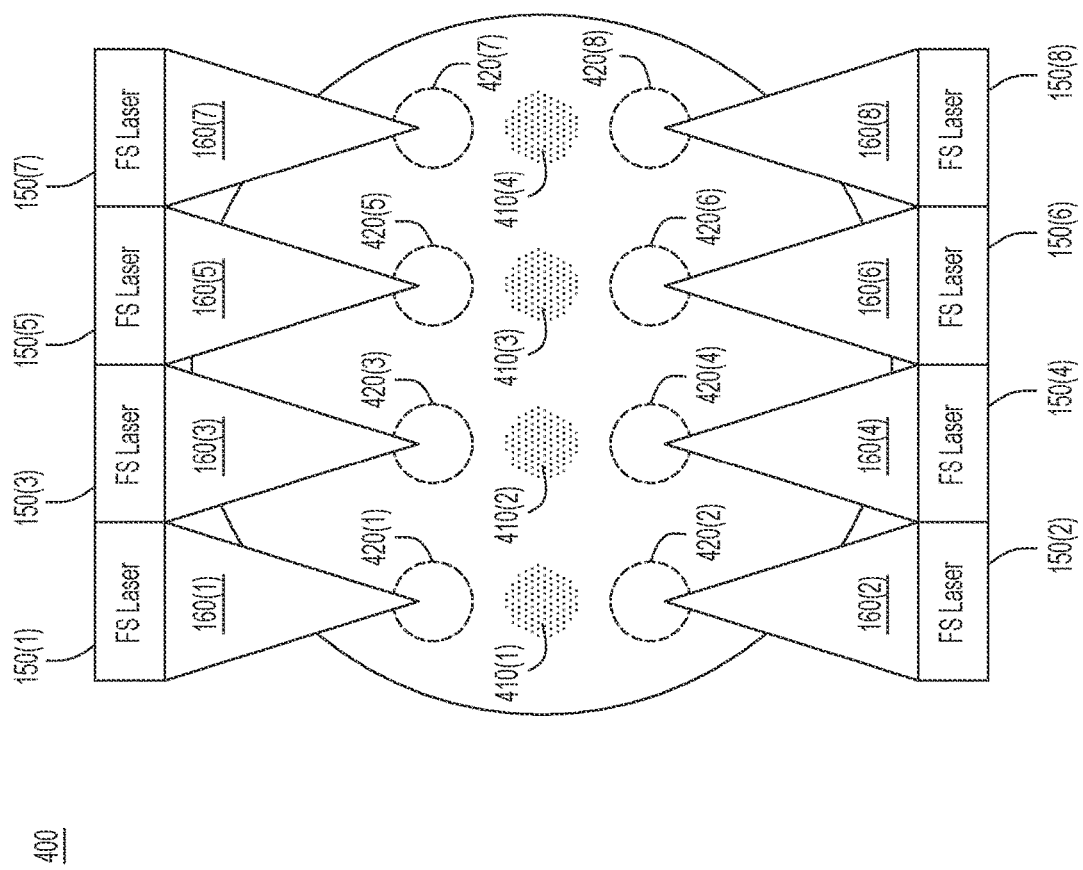
FIG. 4 illustrates a Polarization Maintaining Multi-Core Fiber (PM-MCF) that has been produced by irradiating local volumes of a MCF, according to an example embodiment.

With continuing reference to FIG. 1, FIG. 4 illustrates Polarization Maintaining Multi-Core Fiber (PM-MCF) 400, according to an example embodiment. PM-MCF 400 includes cores 410(1)-410(4) and local volumes 420(1)-420(8). Core 410(1) is flanked by local volume 420(1) and local volume 420(2); core 410(2) is flanked by local volume 420(3) and local volume 420(4); core 410(3) is flanked by local volume 420(5) and local volume 420(6); and core 410(4) is flanked by local volume 420(7) and local volume 420(8).

In one example, a low-cost MCF may be obtained and post-processed to create PM-MCF 400. Local volumes 420(1)-420(8) of the SMF ribbon may be irradiated using femtosecond lasers 150(1)-150(8) to induce an end-to-end birefringence in the MCF ribbon, thereby producing PM-MCF 400.

PM-MCF 400 may be used in RLS applications. Local volumes 420(1)-420(8) may be configurable based on location, shape, size, and/or other aspects. For example, while FIG. 4 illustrates local volumes 420(1)-420(8) in two parallel lines, any suitable formation of irradiated local volumes may be implemented. For instance, irradiated local volumes described herein may be arranged in one or more straight lines, star shapes, circles, etc. While PM-MCF 400 is depicted with four cores (cores 410(1)-410(4)), it will be appreciated that the techniques described herein may be applied to a MCF with any suitable number of cores.

Furthermore, while local volumes 420(1)-420(8) are substantially parallel to the line of cores 410(1)-410(4), in general irradiated local volumes of a PM-MCF may be oriented in any suitable configuration (e.g., substantially parallel, substantially perpendicular, substantially diagonal, or any suitable angle). Configurably orienting the local volumes, post-processing, using femtosecond lasers 150(1)-150(8) may enable flexible, automated rotational alignment of PM-MCFs.

Figure 5:
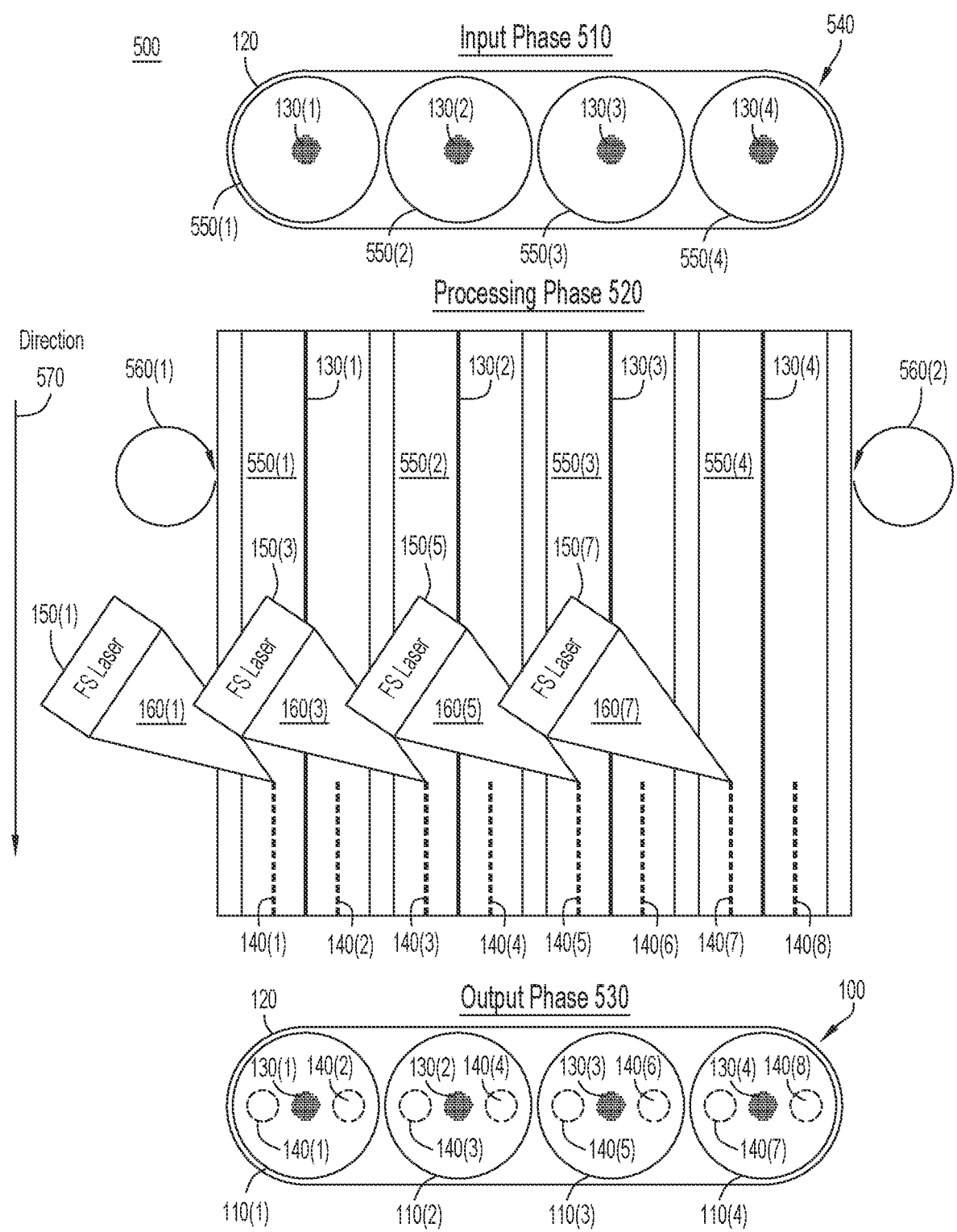
FIGS. 5 and 6 illustrate top and side views of a manufacturing process for producing a PMF ribbon by irradiating local volumes of an SMF ribbon, according to an example embodiment.

With continuing reference to FIG. 1, FIG. 5 illustrates a top view 500 of a manufacturing process for producing PMF ribbon 100, according to an example embodiment. The manufacturing process includes three phases: input phase 510, processing phase 520, and output phase 530. At input phase 510, SMF ribbon 540 is obtained. SMF ribbon 540 includes SMFs 550(1)-550(4) affixed in ribbon coating 120. SMFs 550(1)-550(4) include cores 130(1)-130(4), respectively.

At processing phase 520, local volumes 140(1)-140(8) are irradiated to induce an end-to-end birefringence in SMF ribbon 540. Spools/coils 560(1) and 560(2) may move SMF ribbon 540 in direction 570 toward femtosecond lasers 150(1)-150(8). (Femtosecond lasers 150(2), 150(4), 150(6), and 150(8)— not shown—are located behind SMF ribbon 540.) In one example, spools 560(1) and 560(2) may align SMF ribbon 540 with femtosecond lasers 150(1)-150(8), which may be fixed. In particular, spools 560(1) and 560(2) may control alignment with respect to SMF ribbon 540 along a Y-axis. The positioning of SMF ribbon 540 relative to femtosecond lasers 150(1)-150(8) along the Y-axis may be relatively precise, being dictated mainly by coating diameter accuracy (e.g., 250±20 μm). Modifications to SMF ribbon 540 (e.g., irradiation) may be applied while SMF ribbon 540 is on spools 560(1) and 560(2), before SMF ribbon 540 is cut to length and terminated/connectorized.

In the example of FIG. 5, local volumes 140(1)-140(8) are discontinuous over a substantially end-to-end length of SMFs 550(1)-550(4). That is, local volumes 140(1)-140(8)

may be irradiated as a string of beads, for example, by pulsing femtosecond lasers 150(1)-150(8). This may allow for relatively fast write speeds (e.g., SMF ribbon 540 may proceed through the irradiation equipment relatively quickly). Discontinuous local volumes may guide/re-orient the polarization when a propagating light wave overlaps with an irradiated section.

Alternatively, local volumes may be continuous over a substantially end-to-end length of one or more SMFs. A continuous local volume may be appropriate if, for instance, a discontinuous local volume would be inadequate to maintain the polarization of a guided light wave. Any suitable configuration may be employed. In other examples, multiple femtosecond lasers may be used to irradiate the same local volume, e.g., if one femtosecond laser is not strong enough. Multiple femtosecond lasers may irradiate the same local volume concurrently or sequentially in time.

At output phase 530, based on the end-to-end birefringence induced in SMF ribbon 540, PMF ribbon 100 is produced. PMF ribbon 100 may be similar to SMF ribbon 540, except that PMF ribbon 100 now includes local volumes 140(1)-140(8) which have been irradiated to induce the end-to-end birefringence. Thus, SMFs 550(1)-550(4) have been transformed to PMFs 110(1)-110(4).

Figure 6:
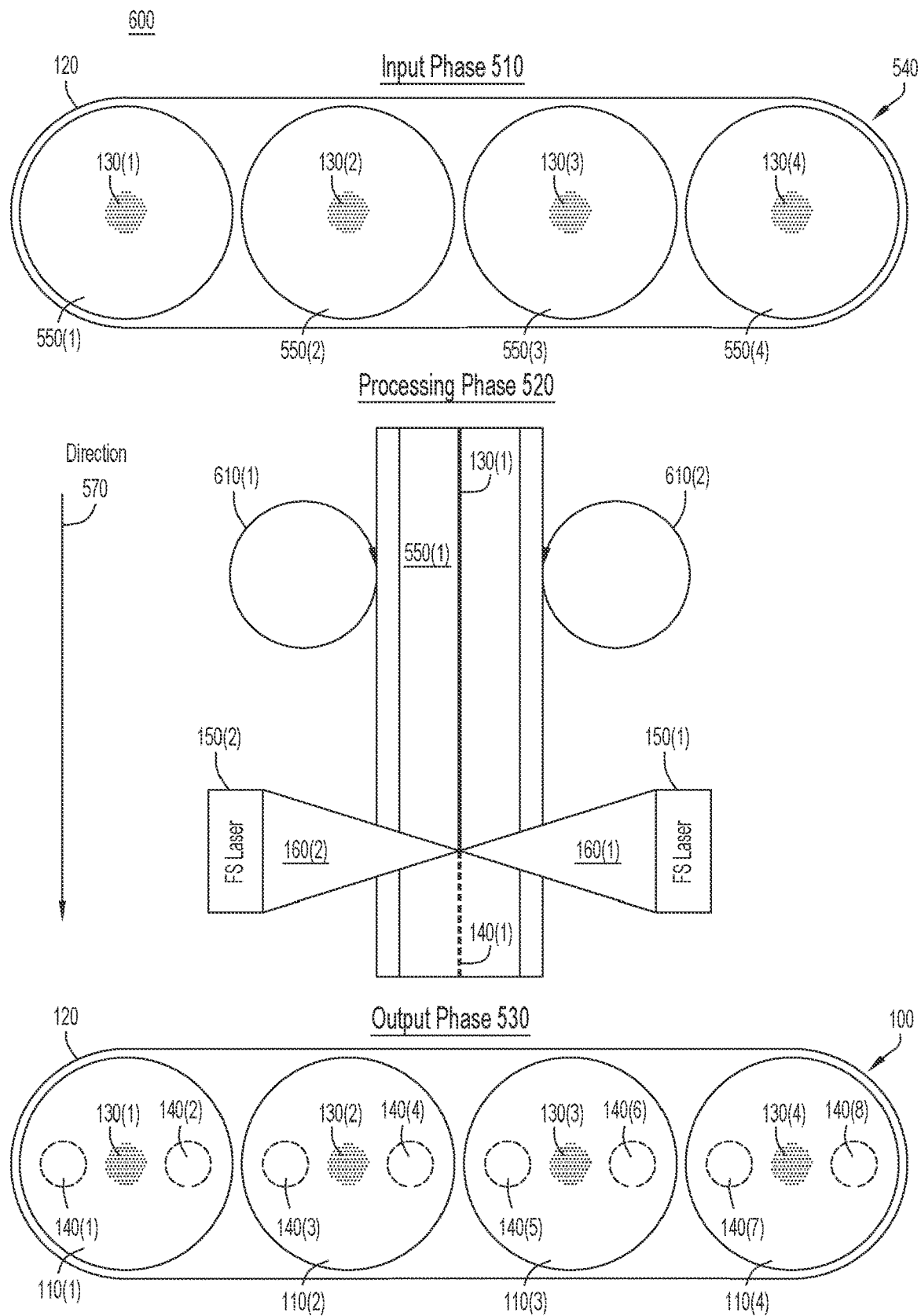

With continuing reference to FIGS. 1 and 5, FIG. 6 illustrates a side view 600 of the manufacturing process for producing PMF ribbon 100, according to an example embodiment. As shown, spools 610(1) and 610(2) may move SMF ribbon 540 in direction 570 toward femtosecond lasers 150(1)-150(8). In one example, spools 610(1) and 610(2) may align SMF ribbon 540 with femtosecond lasers 150(1)-150(8), which may be fixed. In particular, spools 610(1) and 610(2) may control alignment with respect to SMF ribbon 540 along an X-axis. The positioning of SMF ribbon 540 relative to femtosecond lasers 150(1)-150(8) along the X-axis may be relatively precise, being dictated mainly by coating diameter accuracy (e.g., 250±20 μm). Modifications to SMF ribbon 540 (e.g., irradiation) may be applied while SMF ribbon 540 is on spools 610(1) and 610(2), before SMF ribbon 540 is cut to length and terminated/connectorized.

Figure 7:
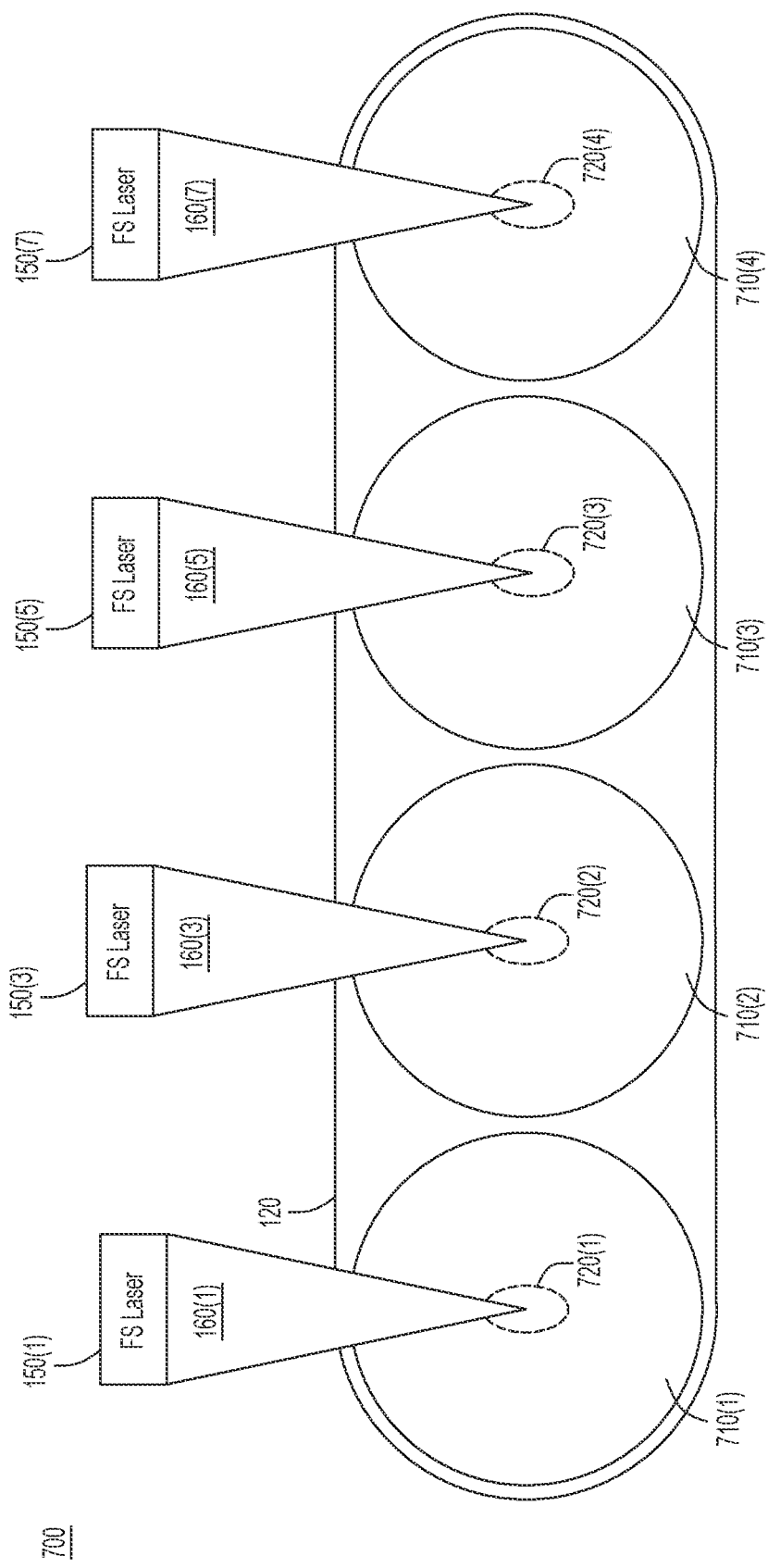
FIG. 7 illustrates a PMF ribbon that has been produced by irradiating local volumes of blank fibers in a blank fiber ribbon, according to an example embodiment.

With continuing reference to FIG. 1, FIG. 7 illustrates PMF ribbon 700, according to an example embodiment. PMF ribbon 700 includes PMFs 710(1)-710(4) affixed in ribbon coating 120. PMFs 710(1)-710(1) include local volumes 720(1)-720(4), which are centered within PMFs 710(1)-710(4) and have circularly asymmetric (e.g., elliptical) cross-sections. Local volumes 720(1)-720(4) may be irradiated similarly to local volumes 140(1)-140(8) and/or 220(1)-220(8).

In this example, PMF ribbon 700 has been produced by irradiating local volumes 720(1)-720(4) of blank fibers in a blank fiber ribbon. Local volumes 720(1)-720(4) may be irradiated using femtosecond lasers 150(1), 150(3), 150(5), and 150(7) to induce an end-to-end birefringence in a blank fiber ribbon, thereby producing PMF ribbon 700. In this example, each blank fiber is irradiated at local volumes 720(1)-720(4) to induce the end-to-end birefringence in each of the blank fibers, thereby producing PMFs 710(1)-710(4). The end-to-end birefringence preserves the polarization of light propagating within PMFs 710(1)-710(4).

The specific parameters of the elliptical cross-section may be configurable. A more elliptical core profile may increase the extinction ratio (and increase birefringence), but the mode field may also be very elliptical. Meanwhile, a less elliptical (more round) mode profile may be easier to handle, but may be less birefringent.

Figure 8:
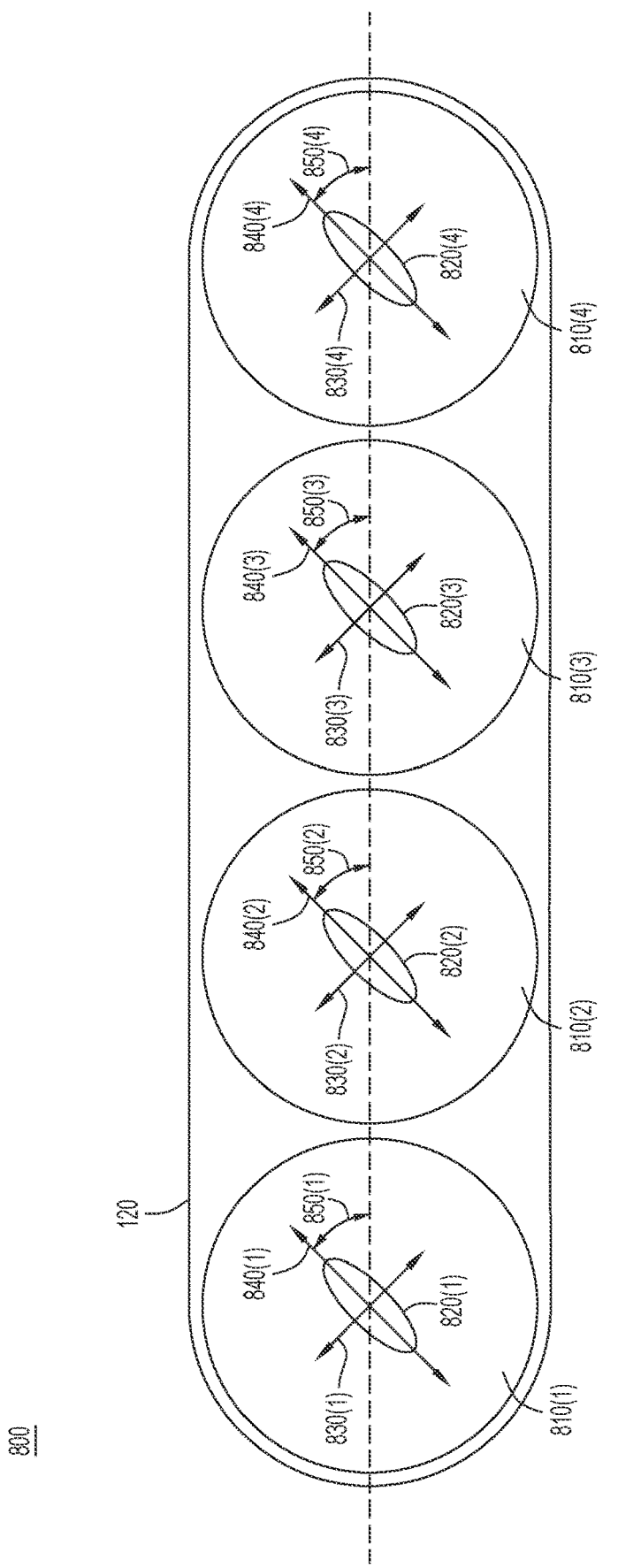
FIG. 8 illustrates a PMF ribbon that has been produced by irradiating local volumes of blank fibers in a blank fiber ribbon, where the PMF includes a fast axis and a slow axis that are oriented at angles that are configurable relative to the PMF ribbon, according to an example embodiment.

With continuing reference to FIG. 1, FIG. 8 illustrates PMF ribbon 800, according to an example embodiment. PMF ribbon 800 includes PMFs 810(1)-810(4) affixed in ribbon coating 120. PMFs 810(1)-810(1) include local volumes 820(1)-820(4), which are centered within PMFs 810(1)-810(1) and have circularly asymmetric (e.g., elliptical) cross-sections. Local volumes 820(1)-820(4) may be irradiated similarly to local volumes 720(1)-720(4).

As illustrated in FIG. 8, PMFs 810(1)-810(4) may include fast axes 830(1)-830(4) and slow axes 840(1)-840(4). Fast axes 830(1)-830(4) and slow axes 840(1)-840(4) may be oriented at configurable angles relative to PMF ribbon 800. For example, slow axes 840(1)-840(4) may be oriented at configurable angles 850(1)-850(4), and fast axes 830(1)-830(4) may be oriented at configurable angles that are 90° from configurable angles 850(1)-850(4).

The configurable angles of fast axes 830(1)-830(4) and slow axes 840(1)-840(4) may be oriented by tilting the elliptical cross-sections of local volumes 820(1)-820(4). For instance, slow axes 840(1)-840(4) may align with the major axes of the elliptical cross-sections, and fast axes 830(1)-830(4) may align with the minor axes of the elliptical cross-sections. Thus, in the specific example of FIG. 7, the slow axes are substantially perpendicular to PMF ribbon 700, and the fast axes are substantially parallel to PMF ribbon 700. It will be appreciated that the angles of fast and slow axes may differ between PMFs 810(1)-810(4).

Figure 9:
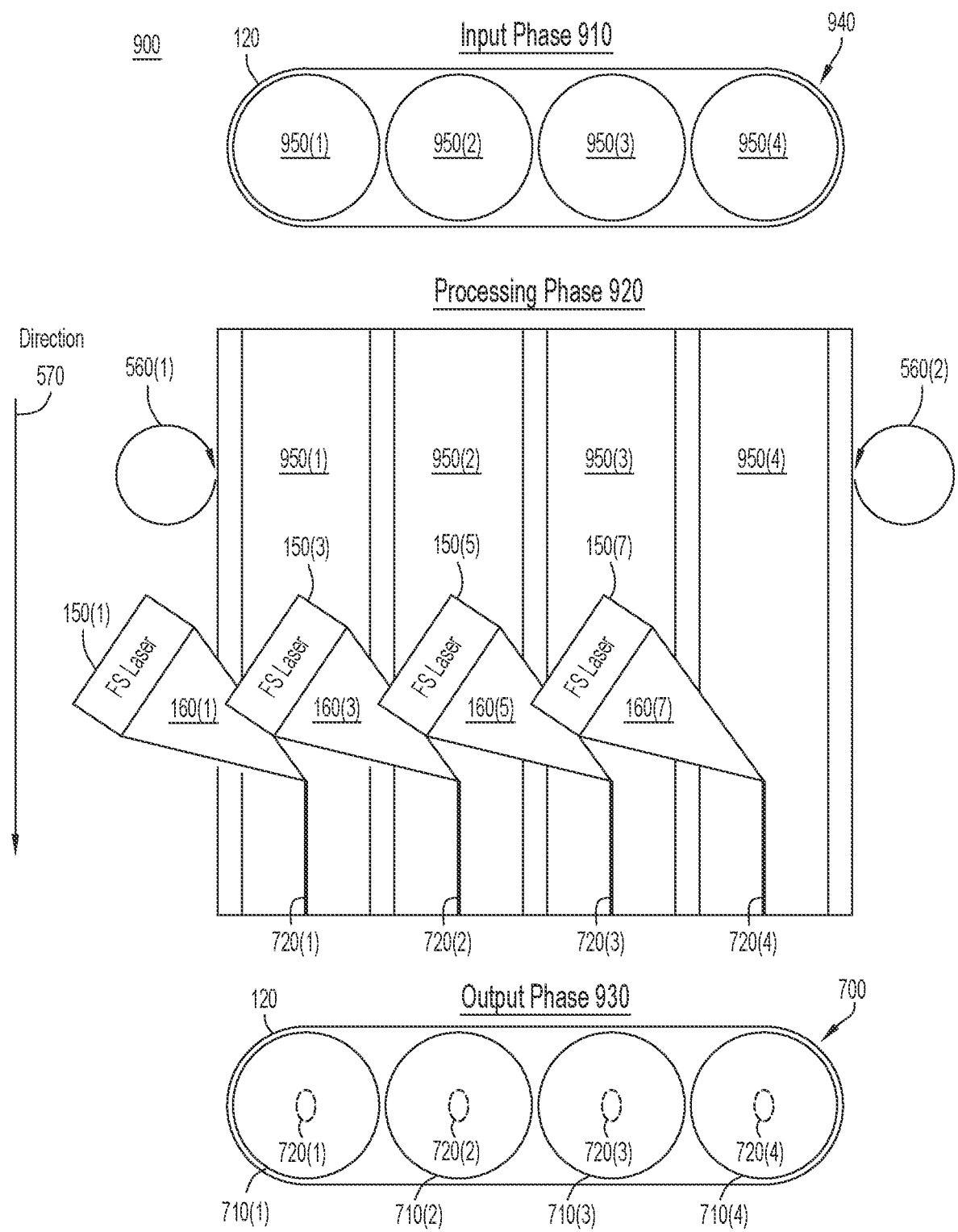
FIG. 9 illustrates a top view of a manufacturing process for producing a PMF ribbon by irradiating local volumes of a blank fiber ribbon, according to an example embodiment.

With continuing reference to FIGS. 1 and 7, FIG. 9 illustrates a top view 900 of a manufacturing process for producing PMF ribbon 700, according to an example embodiment. The manufacturing process includes three phases: input phase 910, processing phase 920, and output phase 930. At input phase 910, blank fiber ribbon 940 is obtained. Blank fiber ribbon 940 includes blank fibers 950(1)-950(4) affixed in ribbon coating 120. Blank fibers 950(1)-950(4) may be internally uniform (e.g., may contain no core).

At processing phase 920, local volumes 720(1)-720(4) are irradiated to induce an end-to-end birefringence in blank fiber ribbon 940. Spools 560(1) and 560(2) may move blank fiber ribbon 940 in direction 570 toward femtosecond lasers 150(1)-150(8). (Femtosecond lasers 150(2), 150(4), 150(6), and 150(8)—not shown—are located behind blank fiber ribbon 940.) In one example, spools 560(1) and 560(2) may align blank fiber ribbon 940 with femtosecond lasers 150(1)-150(8), which may be fixed. In particular, spools 560(1) and 560(2) may control alignment with respect to blank fiber ribbon 940 along a Y-axis. The positioning of blank fiber ribbon 940 relative to femtosecond lasers 150(1)-150(8) along the Y-axis may be relatively precise, being dictated mainly by coating diameter accuracy (e.g., 250±20 μm). Modifications to blank fiber ribbon 940 (e.g., irradiation) may be applied while blank fiber ribbon 940 is on spools 560(1) and 560(2), before blank fiber ribbon 940 is cut to length and terminated/connectorized. In the example of FIG. 9, to prevent scattering of guided light, local volumes 720(1)-720(4) may be continuous over a substantially end-to-end length of blank fibers 905(1)-950(4).

At output phase 930, based on the end-to-end birefringence induced in blank fiber ribbon 940, PMF ribbon 700 is produced. PMF ribbon 700 includes PMFs 710(1)-710(4). PMF ribbon 700 may be similar to blank fiber ribbon 940, except that PMF ribbon 700 now includes local volumes 140(1)-140(8) which have been irradiated to induce the end-to-end birefringence. Thus, blank fibers 950(1)-950(4) have been transformed to PMFs 710(1)-710(4).

It will be appreciated that end-to-end birefringence may be induced by irradiating any suitable local volume of a fiber. In the examples of FIGS. 1-6, local volumes 140(1)-140(8), 220(1)-220(8), and 420(1)-420(8) may be off-center (e.g., flanking cores 130(1)-130(4) and/or 410(1)-410(4)) and may have circular cross-sections. In the example of FIGS. 7-9, local volumes 760(1)-760(4) and 820(1)-820(4) may be irradiated to produce inherently birefringent, polarization-maintaining, elliptical waveguides written into the center of blank fibers 750(1)-750(4) and 810(1)-810(4). In general, end-to-end birefringence may be induced by irradiating any suitable number of local volumes at any suitable placement (e.g., center/off-center) within a fiber, and the local volumes may have any suitable cross-section.

Figure 10:
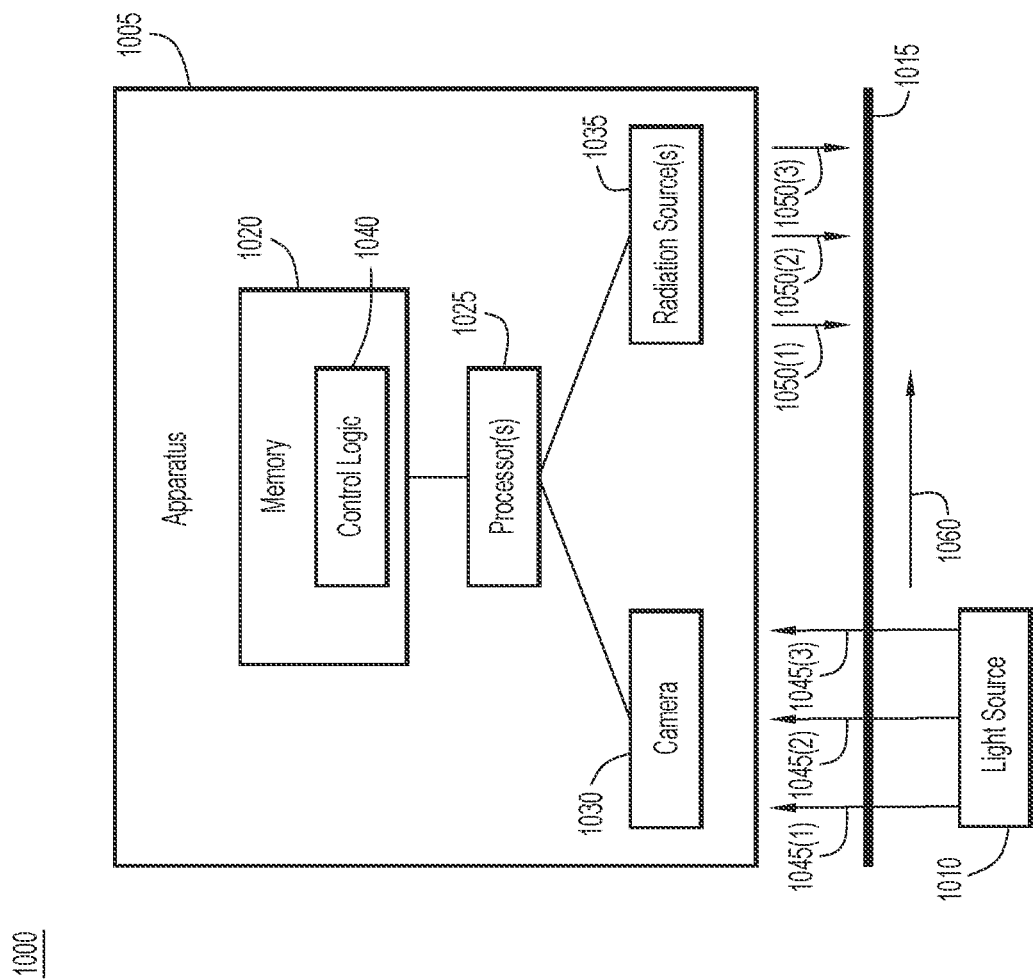
FIG. 10 illustrates a hardware block diagram of a system configured to perform functions associated with operations discussed herein, according to an example embodiment.

Referring to FIG. 10, FIG. 10 illustrates a hardware block diagram of a system 1000 that may perform functions associated with operations discussed herein in connection with the techniques depicted in FIGS. 1-9. In various embodiments, system 1000 may be configured with any entity/entities as depicted in connection with FIGS. 1-9 in order to perform operations of the various techniques discussed herein.

In at least one embodiment, system 1000 may include apparatus 1005, light source 1010, and fiber 1015. Apparatus 1005 includes memory 1020, one or more processors 1025, camera 1030, and one or more radiation sources 1035. Memory 1020 may, in turn, include control logic 1040, which may include instructions to cause one or more processors 1025 to perform operations described herein. In various embodiments, instructions associated with logic for apparatus 1005 can overlap in any manner and are not limited to the specific allocation of instructions and/or operations described herein.

Light source 1010 may be configured to emit light (represented by arrows 1045(1)-1045(3)). Light source 1010 may operate independently from apparatus 1005. However, it will be appreciated that in other examples, light source 1010 may be part of, or coupled to, apparatus 1005. For instance, light source 1010 may be controlled by one or more processors 1025. For example, one or more processors 1025 may control a brightness/power level of light source 1010.

Fiber 1015 may be a standalone fiber or part of a fiber ribbon. Fiber 1015 may be input into system 1000 as a SMF, blank fiber, MCF, etc. Fiber 1015 may be output from system 1000 as a PMF in accordance with examples discussed above.

In at least one embodiment, memory 1020 is configured to store data, information, software, and/or instructions associated with apparatus 1005, and/or logic configured for memory 1020. For example, any logic described herein (e.g., control logic 1040) can, in various embodiments, be stored for apparatus 1005 using memory 1020.

In at least one embodiment, one or more processors 1025 is/are at least one hardware processor configured to execute various tasks, operations and/or functions for apparatus 1005 as described herein according to software and/or instructions configured for apparatus 1005. One or more processors 1025 (e.g., a hardware processor) can execute any type of instructions associated with data to achieve the operations detailed herein. In one example, one or more processors 1025 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor.'

In various embodiments, control logic 1040 can include instructions that, when executed, cause one or more processors 1025 to perform operations, which can include, but not be limited to, providing overall control operations of apparatus 1005; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1040) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad terms 'memory' or 'memory element.' Data/information being tracked and/or sent to one or more entities as discussed herein could be provided in any database, table, register, list, cache, storage, and/or storage structure: all of which can be referenced at any suitable timeframe. Any such storage options may also be included within the broad terms 'memory' or 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory 1020 can store data, software, code, instructions (e.g., processor instructions), logic, parameters, combinations thereof, and/or the like used for operations described herein. This includes memory 1020 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to apparatus 1005 for transfer onto another computer readable storage medium.

Camera 1030 may be any suitable vision detection system configured to capture light, convert the light to image or video, and/or provide the image or video to one or more processors 1025. Camera 1030 may include any suitable hardware and software components to enable image or video capture/transfer.

One or more radiation sources 1035 may be configured to emit radiation (represented by arrows 1050(1)-1050(3)). One or more radiation sources 1035 may be one or more femtosecond lasers or any other suitable source of radiation. One or more radiation sources 1035 may be arranged in any suitable manner, such as in a single column/row, a matrix/array, or any other suitable configuration.

In operation, system 1000 may irradiate fiber 1015 so as to induce an end-to-end birefringence in fiber 1015. For example, apparatus 1005 may irradiate a central local volume of fiber 1015 (e.g., in the case of a blank fiber) or an off-center local volume of fiber 1015 (e.g., in the case of an SMF or MCF). In one example, one or more spools (not shown) may pull fiber 1015 in direction 1060 toward one or more radiation sources 1035. Apparatus 1005 may automatically obtain feedback regarding the end-to-end birefringence induced in fiber 1015 and, based on the feedback, automatically adjust one or more a parameters that control the irradiation of fiber 1015.

For example, apparatus 1005 may obtain feedback in the form of positioning data of the fiber. In particular, light source 1010 may emit light 1045(1)-1045(3), illuminating fiber 1015. Camera 1030 may detect light 1045(1)-1045(3) and send the corresponding picture/video to one or more processors 1025. The picture/video may include positioning data (e.g., contrast imaging data) of fiber 1015. The positioning data may, for example, indicate a position of fiber 1015 within a ribbon (e.g., fiber-to-fiber pitch and the out-of-plane position of fiber 1015 within the ribbon).

Based on the positioning data, apparatus 1005 may automatically adjust fiber 1015. For instance, apparatus 1005 may adjust a position of fiber 1015 relative to one or more radiation sources 1035 using the spools. Apparatus 1005 may, for example, cause the spools to align fiber 1015 with focal points of one or more radiation sources 1035.

Additionally/alternatively, based on the positioning data, apparatus 1005 may automatically adjust one or more radiation sources 1035. In one example, apparatus 1005 may adjust the location of one or more focal points of radiation 1050(1)-1050(3). Thus, even if fiber 1015 moves left or right within the ribbon, the focal points of radiation 1050(1)-1050(3) may track the movement of fiber 1015 to improve the writing accuracy and ensure that end-to-end birefringence is properly induced. In another example, apparatus 1005 may adjust the power or any other characteristics of one or more radiation sources 1035.

Figure 11:
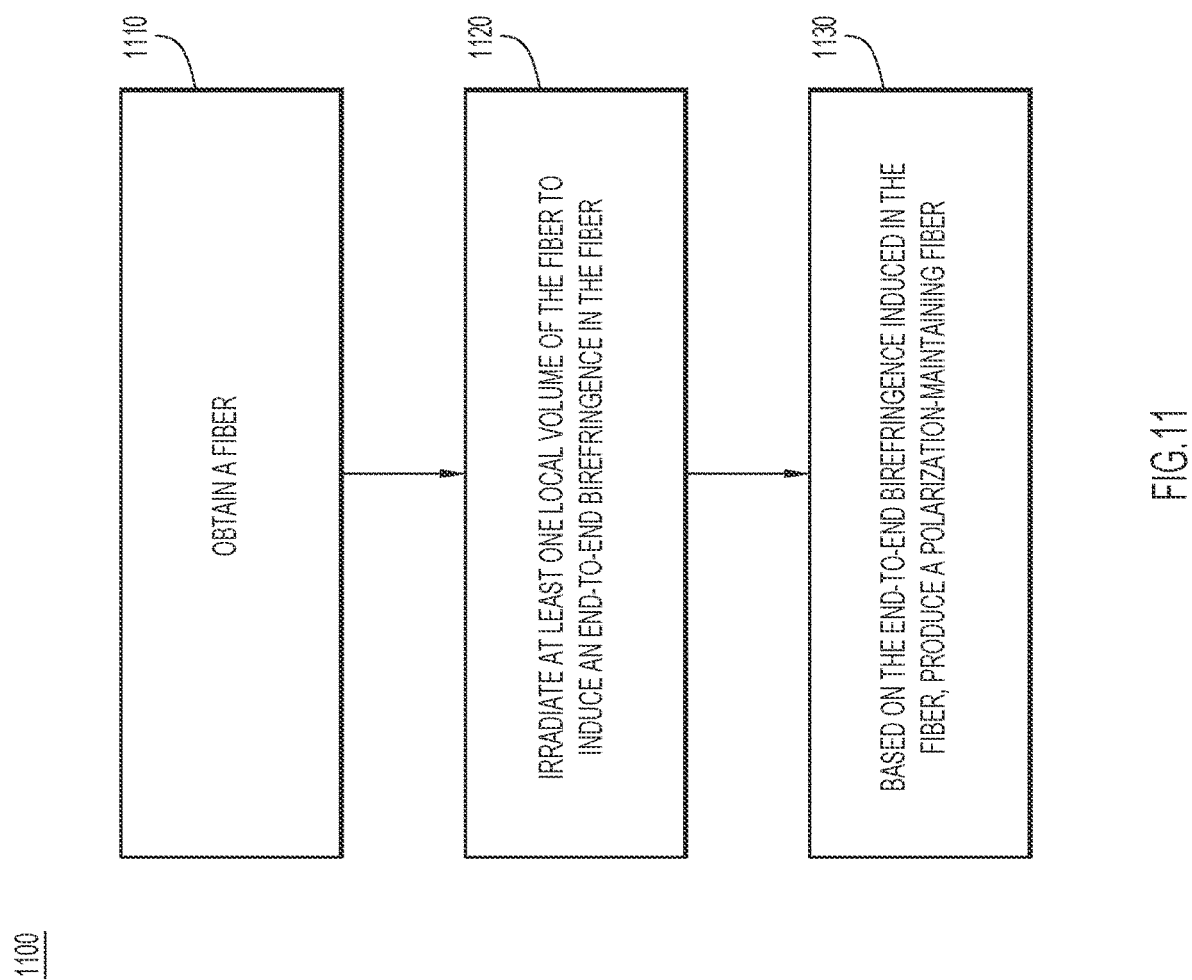
FIG. 11 illustrates a flowchart of a method for performing functions associated with operations discussed herein, according to an example embodiment.

FIG. 11 is a flowchart of an example method 1100 for performing functions associated with operations discussed herein. Method 1100 may be performed by any suitable entity, such as system 1000 and/or apparatus 1005. At operation 1110, a fiber is obtained. At operation 1120, at least one local volume of the fiber is irradiated to induce an end-to-end birefringence in the fiber. At operation 1130, based on the end-to-end birefringence induced in the fiber, a PMF is produced.

Note that with the examples provided herein, interaction may be described in terms of one, two, three, or four entities. However, this has been done for purposes of clarity, simplicity and example only. The examples provided should not limit the scope or inhibit the broad teachings of systems described herein as potentially applied to a myriad of other architectures.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: obtaining a fiber; irradiating at least one local volume of the fiber to induce an end-to-end birefringence in the fiber; and based on the end-to-end birefringence induced in the fiber, producing a polarization-maintaining fiber.

In one example, irradiating the at least one local volume of the fiber includes: altering a matrix structure of the fiber at the at least one local volume of the fiber.

In one example, irradiating the at least one local volume of the fiber includes: irradiating the at least one local volume of the fiber using a femtosecond laser.

In one example, obtaining the fiber comprises: obtaining a ribbon of fibers that includes the fiber. In a further example, irradiating comprises irradiating at least one local volume of each of the fibers to induce the end-to-end birefringence in each of the fibers, the method further comprising: based on the end-to-end birefringence induced in each of the fibers, producing a ribbon of polarization-maintaining fibers including the polarization-maintaining fiber. In another further example, the method further comprises: producing a hybrid ribbon that includes the polarization-maintaining fiber and at least one fiber in which the end-to-end birefringence has not been induced. In still another further example, irradiating the at least one local volume of the fiber includes: orienting a fast axis and a slow axis at angles that are configurable relative to the ribbon.

In one example, obtaining the fiber includes obtaining a single-mode fiber; and irradiating the at least one local volume of the fiber includes irradiating at least one local volume of the single-mode fiber.

In one example, obtaining the fiber includes obtaining a blank fiber; and irradiating the at least one local volume of the fiber includes irradiating at least one local volume of the blank fiber.

In one example, obtaining the fiber includes obtaining a multi-core fiber; and irradiating the at least one local volume of the fiber includes irradiating at least one local volume of the multi-core fiber.

In one example, irradiating the at least one local volume of the fiber includes: irradiating at least one continuous local volume over a substantially end-to-end length of the fiber.

In one example, irradiating the at least one local volume of the fiber includes: irradiating a plurality of discontinuous local volumes over a substantially end-to-end length of the fiber.

In one example, the method further comprises: automatically obtaining feedback regarding the end-to-end birefringence induced in the fiber; and based on the feedback, automatically adjusting one or more parameters that control the irradiating to induce the end-to-end birefringence in the fiber. In a further example, automatically obtaining the feedback includes automatically obtaining positioning data of the fiber; and automatically adjusting the one or more parameters includes, based on the positioning data of the fiber, automatically adjusting the fiber or a radiation source used to irradiate the at least one local volume of the fiber.

In another form, an apparatus is provided. The apparatus comprises: a polarization-maintaining fiber that includes at least one local volume that has been irradiated to induce an end-to-end birefringence in the polarization-maintaining fiber.

In another form, another apparatus is provided. The other apparatus comprises: a radiation source; and one or more processors configured to control the radiation source to irradiate at least one local volume of a fiber to induce an end-to-end birefringence in the fiber to produce a polarization-maintaining fiber.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a ribbon of fibers that includes a fiber;
   irradiating at least one local volume of the fiber to induce an end-to-end birefringence in the fiber; and
   based on the end-to-end birefringence induced in the fiber, producing a polarization-maintaining fiber.

2. The method of claim 1, wherein irradiating the at least one local volume of the fiber includes:
   altering a matrix structure of the fiber at the at least one local volume of the fiber.

3. The method of claim 1, wherein irradiating the at least one local volume of the fiber includes:
   irradiating the at least one local volume of the fiber using a femtosecond laser.

4. The method of claim 1, wherein irradiating comprises irradiating at least one local volume of each of the fibers to induce the end-to-end birefringence in each of the fibers, the method further comprising:
   based on the end-to-end birefringence induced in each of the fibers, producing a ribbon of polarization-maintaining fibers including the polarization-maintaining fiber.

5. The method of claim 1, further comprising:
   producing a hybrid ribbon that includes the polarization-maintaining fiber and at least one fiber in which the end-to-end birefringence has not been induced.

6. The method of claim 1, wherein irradiating the at least one local volume of the fiber includes:
   orienting a fast axis and a slow axis at angles that are configurable relative to the ribbon.

7. The method of claim 1, wherein:
   obtaining the fiber includes obtaining a single-mode fiber; and
   irradiating the at least one local volume of the fiber includes irradiating at least one local volume of the single-mode fiber.

8. The method of claim 1, wherein:
   obtaining the fiber includes obtaining a blank fiber; and
   irradiating the at least one local volume of the fiber includes irradiating at least one local volume of the blank fiber.

9. The method of claim 1, wherein:
   obtaining the fiber includes obtaining a multi-core fiber; and
   irradiating the at least one local volume of the fiber includes irradiating at least one local volume of the multi-core fiber.

10. The method of claim 1, wherein irradiating the at least one local volume of the fiber includes:
irradiating at least one continuous local volume over a substantially end-to-end length of the fiber.

11. The method of claim 1, wherein irradiating the at least one local volume of the fiber includes:
irradiating a plurality of discontinuous local volumes over a substantially end-to-end length of the fiber.

12. The method of claim 1, further comprising:
automatically obtaining feedback regarding the end-to-end birefringence induced in the fiber; and
based on the feedback, automatically adjusting one or more parameters that control the irradiating to induce the end-to-end birefringence in the fiber.

13. The method of claim 12, wherein:
automatically obtaining the feedback includes automatically obtaining positioning data of the fiber; and
automatically adjusting the one or more parameters includes, based on the positioning data of the fiber, automatically adjusting the fiber or a radiation source used to irradiate the at least one local volume of the fiber.

14. An apparatus comprising:
a polarization-maintaining fiber that includes at least one local volume that has been irradiated in a ribbon of fibers to induce an end-to-end birefringence in the polarization-maintaining fiber.

15. The apparatus of claim 14, wherein the at least one local volume includes an altered matrix structure.

16. An apparatus comprising:
a radiation source; and
one or more processors configured to control the radiation source to irradiate at least one local volume of a fiber in a ribbon of fibers to induce an end-to-end birefringence in the fiber to produce a polarization-maintaining fiber.

17. The apparatus of claim 16, wherein the one or more processors are further configured to:
automatically obtain feedback regarding the end-to-end birefringence induced in the fiber; and
based on the feedback, automatically adjust the fiber or the radiation source.

18. The apparatus of claim 16, wherein the radiation source includes a femtosecond laser.

19. The apparatus of claim 14, wherein the at least one local volume has been irradiated using a femtosecond laser.

20. The apparatus of claim 17, wherein the feedback includes positioning data of the fiber.

* * * * *